Dec. 11, 1951      T. DAUGHERTY      2,578,129
COOKING OIL FILTERING APPARATUS
Filed Aug. 31, 1949      2 SHEETS—SHEET 2

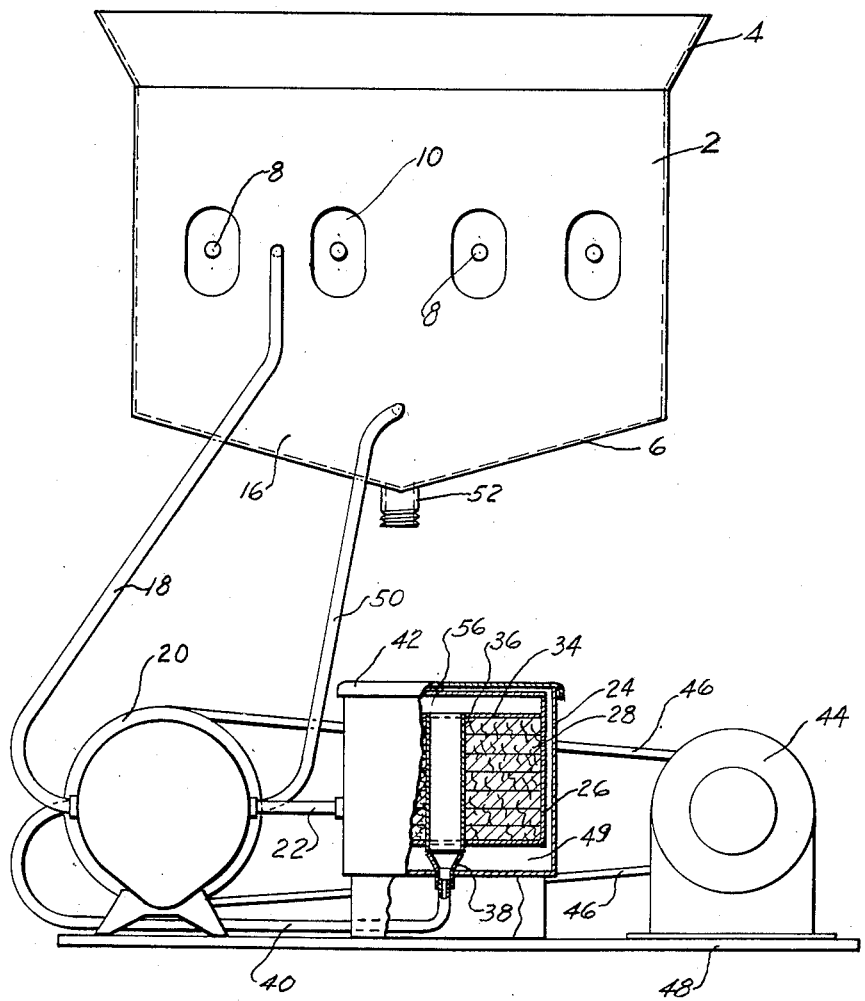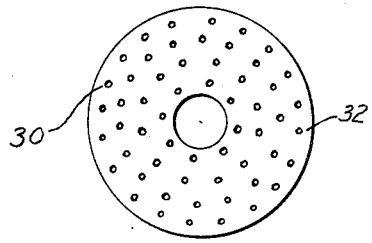

INVENTOR.
T. Daugherty
BY
C. M. McKnight

Patented Dec. 11, 1951

2,578,129

UNITED STATES PATENT OFFICE 2,578,129

COOKING OIL FILTERING APPARATUS

Thomas Daugherty, Tulsa, Okla.

Application August 31, 1949, Serial No. 113,278

1 Claim. (Cl. 99—403)

This invention relates to a method and apparatus for removing impurities from fats, oils and greases utilized with cooking apparatus, and more particularly, but not by way of limitation, to a method and apparatus for filtering all debris from the cooking oils and greases used in deep fat frying containers.

In present day restaurants, one of the important economies is the re-use of fats, oils and greases in deep fat fryers normally utilized in the frying of onions, potatoes, fish, fowls and the like. The usual procedure is to drain the dirty grease from the deep fat fryer after it has been used for a length of time, and then filter it in an independent filtering device, after which it is replaced for re-use in the deep fat fryer container.

The present invention is generally concerned with a deep fat fryer having in combination a filtering apparatus which will provide a selective circulation of the dirty fats or oils from the fryer which are automatically filtered and cleaned and returned to the fryer for re-use.

An important object of this invention is to provide a combination deep fat fryer adaptable for use in restaurants or any place where there is desired deep fat frying, and having an automatic filtering system for removing all debris and cooking odors from the grease in order to selectively clean the cooking oil or grease and thereby maintain a longer and economical use thereof.

And still another object of this invention is to provide a method of continually filtering oil or grease in a deep fat fryer in order to constantly eliminate carbon deposits, debris and odors from the cooking oil or grease, thereby facilitating a longer use of the cooking oil or grease.

And still another object of this invention is to selectively filter cooking oil or grease from a deep fat fryer for the elimination of carbon deposits and debris in the oil, which consists of discharging the hot oil and directing it through a filter for cleaning, whereupon it is pumped back into the deep fat fryer as clean oil.

And still another object of this invention is to provide a deep fat fryer which will selectively filter the cooking oil or grease automatically and which is simple in operation, durable and inexpensive to construct.

Other objects and advantages of the invention will be evident from the following detailed description, read in conjunction with the accompanying drawings, which illustrate my invention.

In the drawings:

Fig. 1 is a side elevational view of the invention.

Fig. 2 is a detail view of an element of the filter unit.

Figures 3, 4:
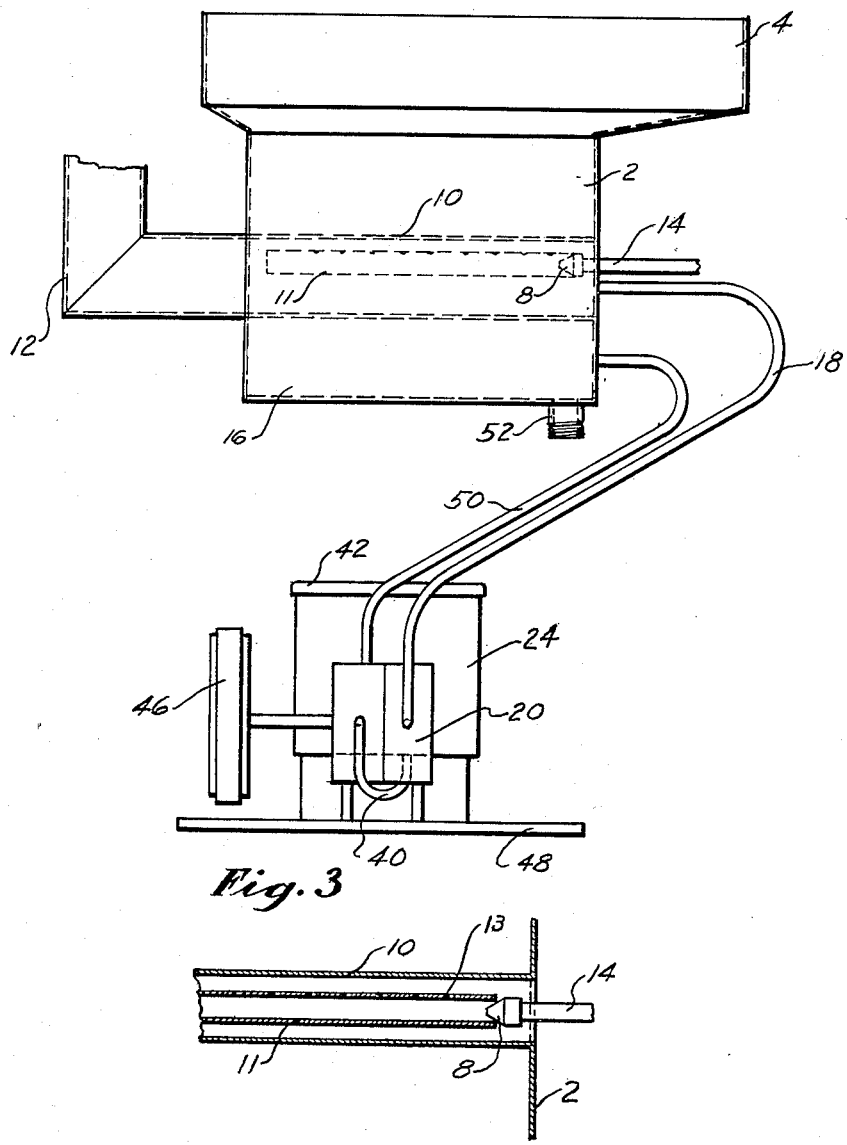
Fig. 3 is an end view of the apparatus shown in Fig. 1.
Fig. 4 is a detail view of one of the burner units.

Referring to the drawings in detail, reference character 2 designates a container of any suitable type that is utilized as a deep fat fryer for restaurants or the like, and is provided with outwardly flared upper rim portion 4, and a substantially conical shaped bottom portion 6. The container is utilized as the fryer compartment for the cooking of french fried potatoes, chicken, onions, or any other deep fat frying normally used in large kitchens. The inside of the container 2 is heated by a plurality of burners 8 preferably horizontally spaced and disposed at substantially a media point of the vertical heighth of the housing or container 2. As clearly disclosed in Fig. 1, four burners are shown, but it is understood that the invention is not limited thereto. Each of the burners 8 are arranged in one end of separately spaced baffle cylinders 10 extending across the container 2. The burner nozzles 8 communicate with a perforated burner tube 11 having perforations 13 in the top portions of the tube 11 for a purpose as will be hereinafter set forth. The baffle members are in communication (not shown) with an exhaust outlet or flue 12. Each of the burners 8 have an inlet fuel pipe 14 connecting with any suitable source of fuel, not shown.

The housing 2 is provided with cooking oil or grease of any suitable type, and the oil or grease is usually disposed in the container at a heighth well above the baffle members 10 so that the burner flame from the burners 8 will heat the top part of the baffle 10 and consequently provide a more concentrated heat to the grease or cooking oil disposed in the upper portion of the container 2. It will thus be apparent that the cooking oil or grease in the lower portion 16 of the fryer 2 is at a lower temperature since there is not an equivalent application of heat from the burners 8. The purpose of directing the burner heat at the middle or upper part of the tank 2 is because the majority of the cooking is done in that part of the container, and the carbon deposits or other debris in the cooking oil or grease will fall to the lower portion 16 of the housing 2, so that the colder grease or oil disposed in the lower portion will assist in maintaining the debris in said lower portion and out of contact with the actual cooking oil or grease.

It will be apparent that the present deep fat fryer or container 2 may be utilized as a receptacle disposed in a stove, but is preferably provided in a separate housing of any suitable type (not shown) that is separate from a cooking stove, and is capable of carrying or supporting therewith the filtering and pumping apparatus now to be described.

The deep fat fryer apparatus provides for the filtering of cooking oil or grease contained therein by providing communication with an outlet pipe 18 preferably disposed between the spaced burner baffles 10, and the conduit 18 is in communication with any suitable dual type recirculating rotary pump unit 20 for pumping the hot grease or oil from the tank 2 and through the pump 20, and into a discharge conduit 22, in turn communicating with a tank or container 24 having any suitable type filtering medium disposed therein. The filtering medium is preferably in the form of a separate container 26 provided with a plurality of layers 28 of any suitable type of filter medium, such as fuller's earth, excelsior and the like, or a combination of the above, so that the filter will be capable of absorbing the burnt carbon, water and other debris that may be present in the cooking oil discharged from the conduit 22. The burnt cooking oil or grease from the tank 2, and pumped through conduit 22 into the filter tank 24, is directed upwardly through the filter unit 26 by the provision of a plurality of perforations 30 provided in the lower plate 32 of the unit 26. A similar perforated plate 34 is provided at the top of the unit 26. Furthermore, the filter unit 26 is provided with a tubular baffle member 36 disposed centrally thereof, and having an open end at the top thereof conterminous with the upper plate 34. The lower end of the tubular baffle 36 is in communication with a discharge funnel 38 in turn connected with a conduit 40 communicating with the suction or intake side of the pump 20.

The filter container 24 is provided with a lid 42 that may be held thereon by any suitable clamping member (not shown). The pump 20 is operated by any suitable source of motive power, such as electric motor or the like 44, connected to the pump through a drive belt 46. The pump unit, consisting of the pump 20, filter 24, and drive motor 44, is preferably disposed on a base 48 which in turn is preferably disposed in a suitable housing member as a unit with the fryer or container 2 in a manner not shown. The deep fat fryer container 2 is preferably provided with any suitable type of thermostatic switch (not shown) having an element in contact with the cooking oil and which may be set for any predetermined temperature or degree of heat of the oil in the compartment 2. As soon as the oil reaches the predetermined temperature, the switch will automatically cause operation of the motor 44 to cause simultaneous operation of the rotary vane pump 20.

*Operation*

In operation, the cooking oil or grease is heated through the burners 8 and as soon as the temperature rises sufficiently to cause operation of the switch (not shown), the pump 20 is actuated to remove the grease in the upper portion of the container through the conduit 18 where it is discharged through the conduit 22 into the lower portion 49 of the filtering tank 24. Continued operation of the pump forces the hot dirty grease upwardly through the filter unit 26 whereupon the carbon deposits and other debris are removed by the filtering medium 28, and the clean oil is allowed to discharge through the upper perforated plate 34 into an upper chamber 56 where it is directed downwardly through the cylindrical baffle 36 into communication with the conduit 40. The conduit 40 is in communication with the intake side of the pump 20, causing the filtered oil to be directed therethrough and discharged through a conduit 50 in turn connecting with the fryer container 2. The outlet end of the conduit 50 is preferably disposed in the lower portion 16 of the container 2. The purpose of discharging the clean, filtered oil into the lower compartment of the container 2 is to distort the cooler cooking oil or grease at the bottom of the container 2, thereby providing a jetting action that will agitate the carbon deposits and other debris that have fallen therein from the hotter cooking oil above the burner baffle 10, whereupon the carbon deposits may be caused to flow out of and into the conduit 18 and pump 20.

The conical bottom portion 6 of the cooking fryer 2 is provided with an outlet pipe 52 for receiving any suitable type of closure plug (not shown) to allow for removal of the cooking oil from the container 2 when it is desired to replace the used cooking oil with entirely new, clean cooking oil or grease. It will be apparent that the dirty cooking oil is pumped from the deep fat fryer 2 and filtered in the filtering unit 26 for return to the fryer 2 in such a manner that the dirty oil is primarily baffled from the filtered clean oil, whereupon the filtered oil is allowed to discharge through the cylindrical member 36 in order to be pumped back into the container 2. The thermostatic switch (not shown) may be set for any predetermined degree of heat in the compartment 2, for example, 250° F., whereupon the apparatus will selectively and continually discharge the dirty cooking oil or grease in the deep fat fryer through the filter medium 28 for eliminating the carbon deposits, debris and other matters therein. The filtering process will be maintained as long as the temperature in the fryer 2 is sufficient to maintain operation of the pump 20. Furthermore, the selective and combined frying and filtering of the cooking oil or grease will cause the oil or grease to remain clean for a longer period of time, and thus preclude the numerous replacements with clean oil as is now done in present day deep fat fryer apparatuses.

The filter unit 26 and the filter members 28 are provided as a unit and may be easily disposed of and replaced as a unit, if desired. Furthermore, the deep fat fryer apparatus does not provide for a constant overall heating of the grease, but the application of heat from the burners 8 is directly applied to the grease in the middle and upper portions of the container 2, whereupon the cooler grease in the lower compartment 16 assists in maintaining the debris and carbon deposits falling there-into. While the flow of oil or grease has been shown directed upwardly through the filter 28 and discharged through the outlet funnel 38 and conduit 40, it will be apparent that the flow to and from the pump 20 could be arranged so that the hot oil or grease coming from the fryer 2 will discharge into the filter 24 through conduit 40 and funnel 28, whereupon it will be permitted to flow downwardly through the filter members 28 and back through the conduit 22, pump 20 and conduit 50 to the fryer 2.

Changes may be made in the combinations and arrangement of parts as heretofore set forth in the specification and shown in the drawings, it being understood that any modification in the precise embodiment of the invention may be made within the scope of the following claim without departing from the spirit of the invention.

I claim:

A cooking apparatus comprising, a container adapted to contain deep fat into which the food to be cooked is introduced, said container having a conical bottom portion, means for heating the deep fat including a tubular housing extending across the container at substantially the media region of the vertical height and having a heating unit therein adapted to concentrate the heat at the top portion of the tubular housing, said container having an outlet at substantially the level of the heating means, pumping means connected with the outlet for removing used fat from the container, filtering means connected with the pump for receiving the used fat and filtering it, and means for returning the filtered fat to the container including a conduit connecting the filtering means with the container adjacent the bottom thereof and arranged to deliver the fat to the container in a stream directed horizontally and transversely of the container.

THOMAS DAUGHERTY.

REFERENCES CITED

The following references are of record in the file of this patent:

UNITED STATES PATENTS

| Number | Name | Date |
| --- | --- | --- |
| 1,234,131 | Cleveland | July 24, 1917 |
| 2,124,186 | Childs | July 19, 1938 |
| 2,182,735 | Odowd | Dec. 5, 1939 |
| 2,212,905 | Tota | Aug. 27, 1940 |
| 2,243,661 | Tota | May 27, 1941 |
| 2,287,396 | Roth | June 23, 1942 |
| 2,546,163 | McBeth | Mar. 27, 1951 |